Sept. 8, 1959  D. H. McCOY  2,903,277
BOOK INDEXES
Filed March 11, 1957  4 Sheets-Sheet 1

Inventor.

Donald Henderson McCoy

Sept. 8, 1959   D. H. McCOY   2,903,277
BOOK INDEXES

Filed March 11, 1957   4 Sheets-Sheet 2

Inventor,
Donald Henderson McCoy

Sept. 8, 1959  D. H. McCOY  2,903,277
BOOK INDEXES
Filed March 11, 1957  4 Sheets-Sheet 3

Inventor,
Donald Henderson McCoy

Sept. 8, 1959     D. H. McCOY     2,903,277
BOOK INDEXES

Filed March 11, 1957     4 Sheets-Sheet 4

Inventor,
Donald Henderson Mc

United States Patent Office 2,903,277
Patented Sept. 8, 1959

2,903,277
BOOK INDEXES
Donald Henderson McCoy, Buffalo, W. Va.

Application March 11, 1957, Serial No. 645,298

2 Claims. (Cl. 283—39)

The index is adapted for use in connection with volumes containing individual parts which are classified, and is especially adapted for use in connection with the Bible. The index will therefore be explained with special reference to its use as a Bible-index; but it must be understood that it is equally adapted for use and equally advantageous in connection with other books similarly divided or subdivided.

The index supplies the above mentioned need, by presenting an attractive and time-saving index that will appeal to the very young through the very old readers of the Bible.

Figure 1:
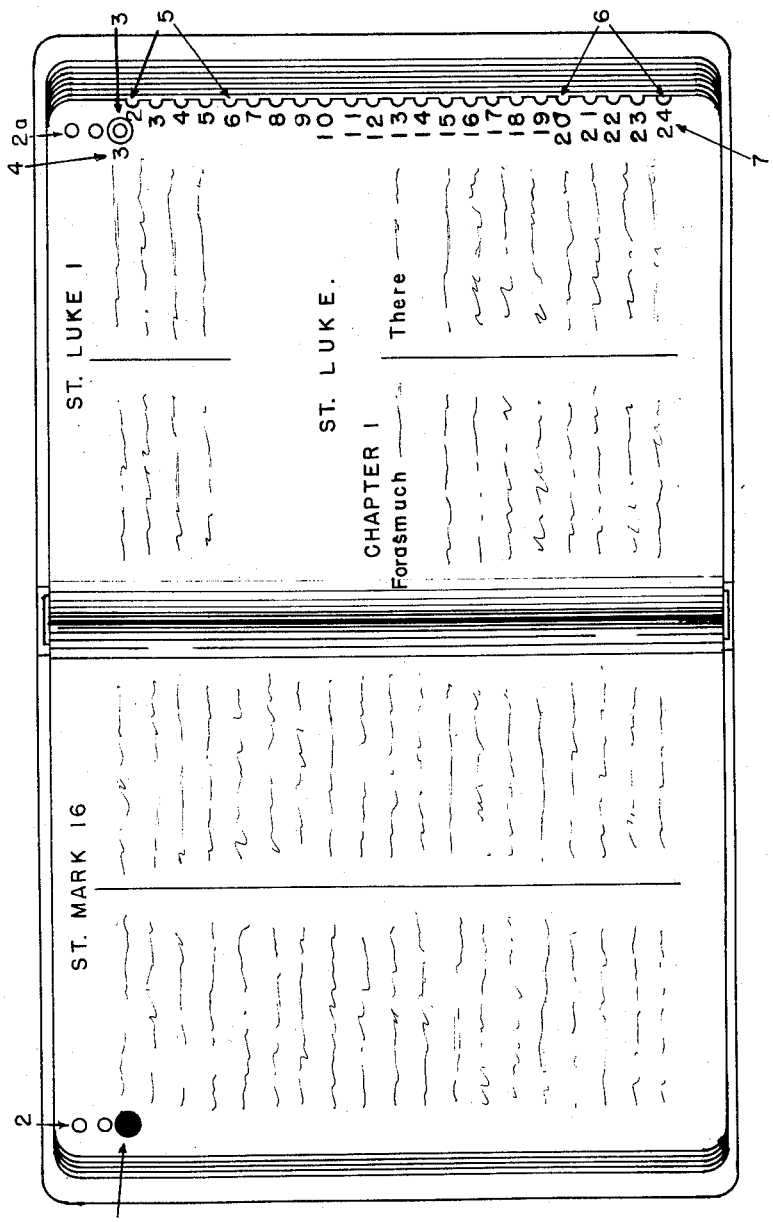
Figure 3:
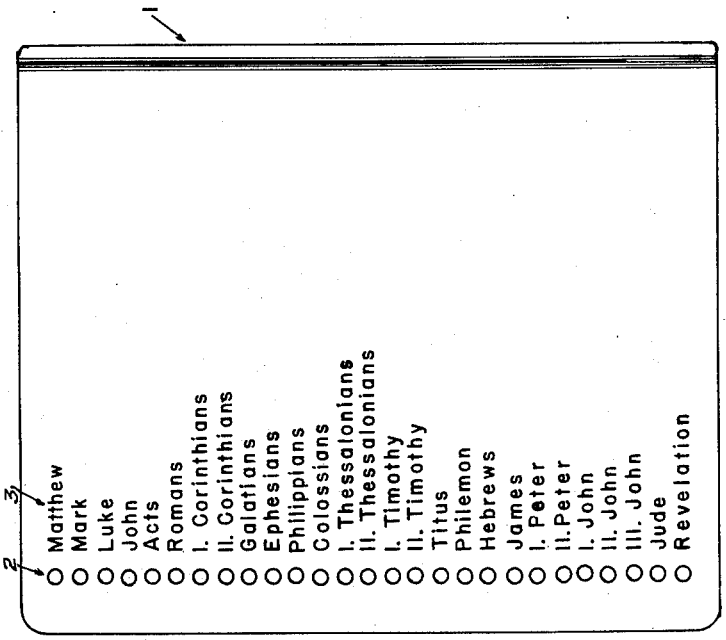
Figure 2:
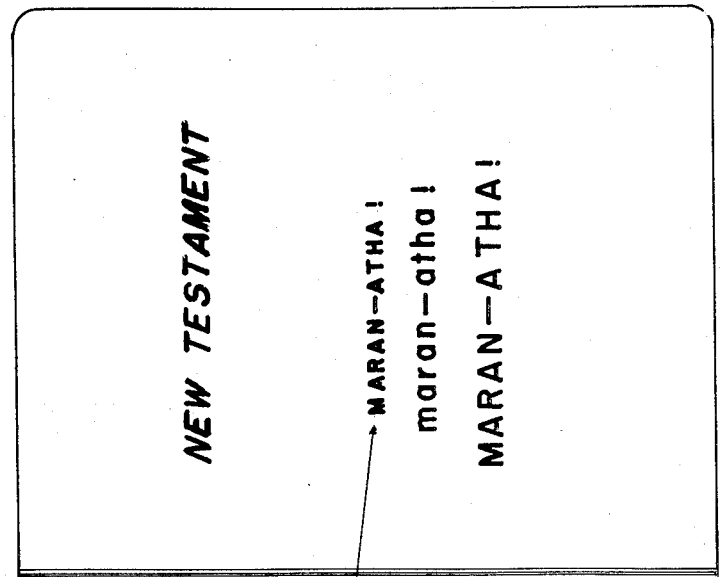
Figure 4:
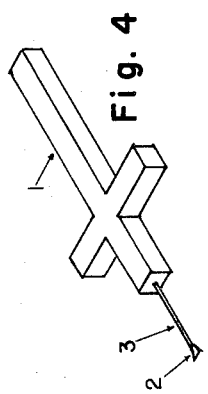
Figure 6:
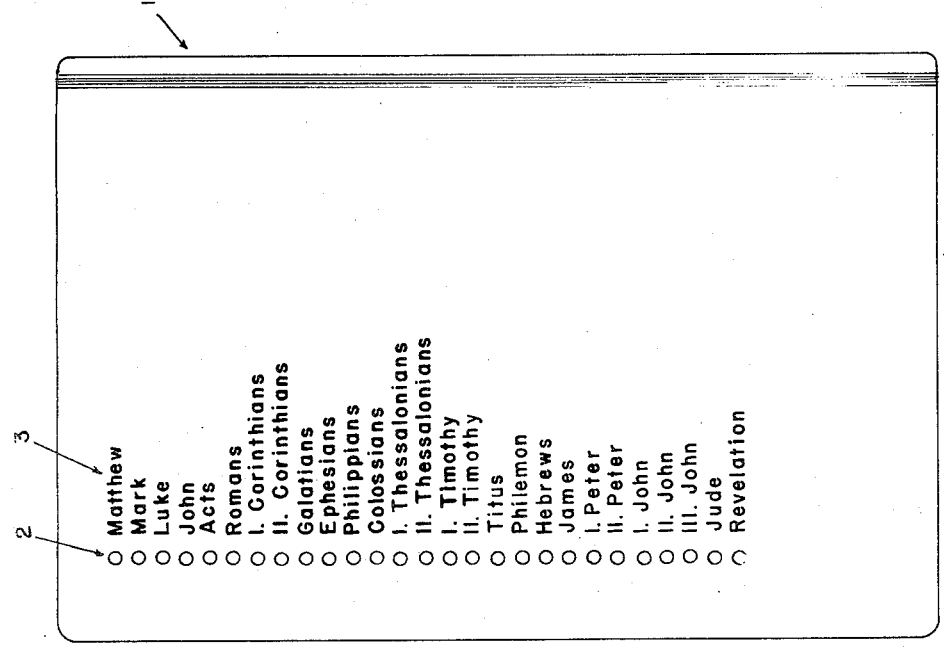
Figure 5:
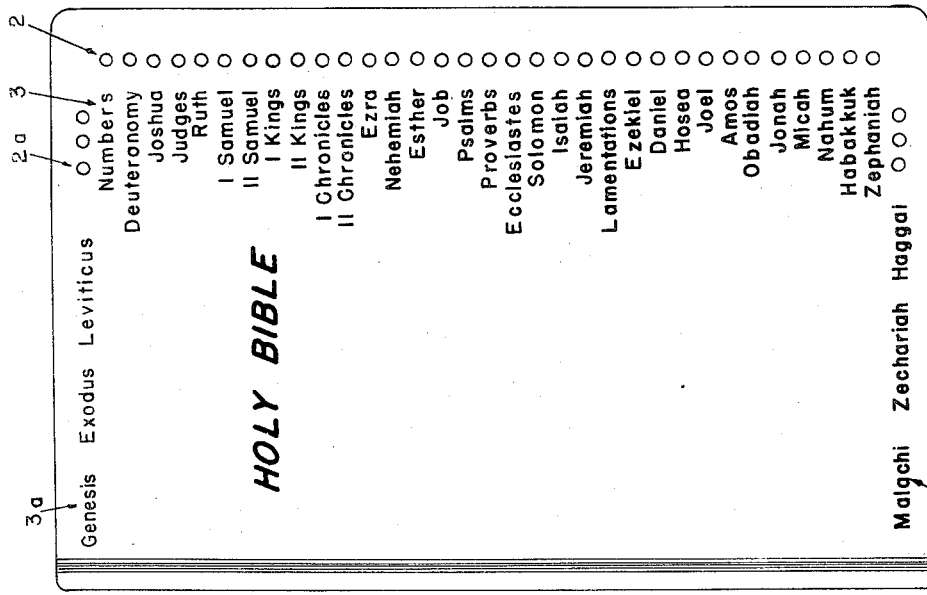
Figure 7:
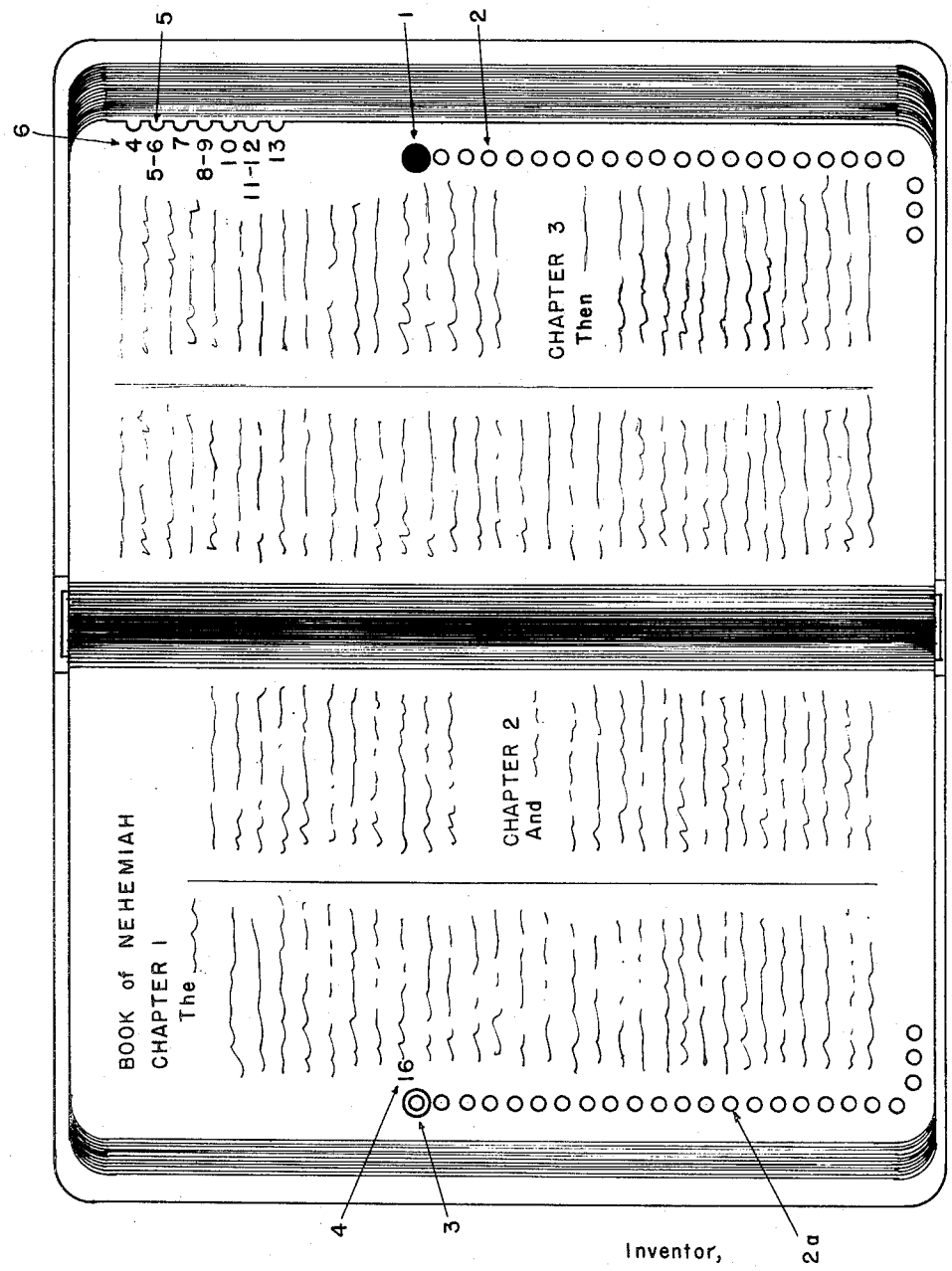

In the accompanying drawings, forming a part of this specification, and in which characters of reference indicate corresponding parts, Fig. 1 is a view in perspective of a portion of the New Testament, exhibiting a portion of the index combined therewith. Fig. 2 is a view in plan, exhibiting the front cover of the New Testament, as it appears when sold as an article of manufacture. Fig. 3 is a view of the back cover of the same New Testament mentioned in Fig. 2, exhibiting a portion of the index. Fig. 4 is a view of a cross with a steel shaft secured to one end, hereafter referred to as "Index Key." Fig. 5 is a view in plan, exhibiting the front cover of the Holy Bible, with a portion of the index embodied thereon, and as it appears when sold as an article of manufacture. Fig. 6 is a view of the same Holy Bible mentioned in Fig. 5, but exhibiting the back cover with a portion of the index embodied thereon. Fig. 7 is a view in perspective of a portion of the Old Testament, exhibiting a portion of the index.

Having explained the index in a general way, I will now proceed to explain the same more in detail, reference being made to the accompanying drawings, in which is illustrated an embodiment of the invention. The New Testament equipped with the index will be explained first.

The New Testament, as is well known is divided into twenty seven books or sections. Each of the books or sections of the New Testament is further divided into sub-sections or chapters, the number of chapters varying with each book. The New Testament is formed of a plurality of relatively thin sheets which are arranged in superimposed relation and assembled or bound along one edge thereof in conventional book form. The flexible sheets are disposed preferably between a semiflexible protective cover and back. Both the front and back surfaces of each cover in this instance have printed matter thereon, also a series of holes, used in the manipulation of the index, are disposed on the back cover of the New Testament. The printed matter is arranged so that a margin is provided on the outer edge of each sheet. The margin is substantially parallel to the bound edge. The margins formed on the front and back surfaces of each sheet are of the same width and length, and located within the margin on the right-hand page is a column of indices. In the column are numerals corresponding to the numbers of the chapters in the book, in this instance, two through twenty-four, there being twenty-four chapters in the Book of St. Luke, chapter number one not being included in the indices as it is automatically obtained when the Book of St. Luke is turned to by a manipulation of the index from the back of the book, in this instance the New Testament, this manipulation being explained in detail in a following portion of this specification.

Referring now to the drawings, Fig. 1, the New Testament, incorporating a portion of the index, is shown opened to the Book of St. Luke. Number 1 is a pad or shield attached to the sheet on the left-hand side of the book. In this instance it is a gummed disc made of material such as used in gummed reinforcements for punched or drilled holes in paper. Its use will be explained in another part of this specification. Number 2 are holes in the sheet on the left-hand side of the book, and are of such size that they are within the margin provided between the writing and the outer edge of the book. Number 2a are similar holes located on the right-hand page of the book, and will line up with the holes, number 2, on the left-hand page when the book is closed. They also will be more fully explained in a later portion of this specification. Number 3 is a hole in the right-hand sheet, similar to 2 and 2a but with a reinforcement around it, such as the gummed reinforcements that are on the market. This last hole in the column of holes is always reinforced, and will line up with the pad, number 1, when the book is closed. Number 4 is the numeral indicating the number of the book as arranged in its regular sequence, as Matthew, Mark, Luke, John, etc. Luke, as in this instance is a 3rd book. Number 5 are notches or semicircles cut through the edge of the sheet, and arranged in line with 7, the chapter indices. These notches or semicircles are cut on the following sheets that are between the indices and the chapter of the book they indicate, they being cut so that they are in line and will allow an instrument to pass through the opening to the desired chapter. The above mentioned instrument and its use will be fully explained in the manipulation explanation of the index. Number 6 is a color dot, in this instance red ink, this color dot is placed on the sheet that has the chapter of the book on it, and directly under the notch or semicircle cut in the sheet or sheets. This color dot serves as a terminating point for the notches or semicircles cut in the edges of the sheets, and because of its color it is easily distinguished from the other sheets or parts of the same sheet on which it is placed.

In Fig. 2, number 1 is a New Testament shown closed and the front cover with its usual title "New Testament" is displayed.

Fig. 3, number 1 is the same New Testament mentioned in Fig. 2, but with its back turned upward and displaying a column 3, of the names of the books of the New Testament arranged in their regular sequence. On the left of each of the names is 2, a hole through the cover and extending through all the inclosed sheets until the book indicated on the column is reached. Fig. 4, number 1 is a cross with a steel shaft 3, secured to one end and provided with a two edged head 2, to be used as a tool in the manipulation of the index. Its use will be fully explained in the manipulation explanation. This instrument is named "Index Key" because it literally is a key to open a book equipped with the index. Fig. 5, number 1 is the Holy Bible shown closed and with the front cover uppermost displaying a column 3 and 3a, of the names of the books of the Old Testament, also holes 2 and 2a, in the cover and extending through the inclosed sheets to the books of the Old Testament indicated on the cover number 2a is the same as number 2 but the holes are arranged in a horizontal line, and are used for the first three books and the last three books of the Old Testament. Fig. 6, number 1 is the same Bible mentioned in Fig. 5, but with the back cover uppermost and displaying a column 3 of the names of the books of the New Testament, also holes 2 in the cover and extending through the enclosed sheets to the book indicated in the New Testament.

Fig. 7, number 1 is the same as described in Fig. 1, but is now placed on the right-hand sheet; number 2 and 2a are the same as in Fig. 1; number 3 is the same as in Fig. 1, but placed on the top hole and on the left-hand page; number 4 is for the same purpose as number 4 in Fig. 1 but it now is indicating the 16th book of the Old Testament; number 5 is the same as number 5 in Fig. 1; number 6 is the same as number 7 in Fig. 1, but extending only over part of the page, there being only 13 chapters in the Book of Nehemiah. Attention is called to 5—6, 8—9, and 11—12, in the chapter indices. They indicate that more than one chapter appears on the same sheet, and are read thus, five through six, eight through nine, etc.

Fig. 1 and Fig. 7 are used as examples for all the other books of the New Testament and Holy Bible. The other books are indexed in the same manner and differ only in the number of chapters they contain.

There being many variations possible in the manipulation of the index, and reasonable supposition to believe that its users will develop their own technique according to their several abilities, I will now explain in detail a basic method of its use. The New Testament will be explained first. Pick up the New Testament, grasping it with the left hand with the bound edge next to the palm of the hand, now, shift it in your hand until it is held more or less loosely with the fingers on the bottom cover and the thumb resting lightly on the top cover, next, turn the book in your left hand until the back cover is in the desired position. This can easily be done without using the other hand. Now, with all the names of the books of the New Testament in full view, the reader can select any book he or she desires. As the Book of St. Luke is being used as an example I will continue with it, but any other book could be used just as easily. The Book of Luke having been selected, insert the "Index Key" in the hole that is on the left and in line with "Luke." With the "Index Key" held loosely but firmly in the hole with the right hand revolve the book in the left hand to its first position between the fingers and thumb. The book should now be in an almost horizontal position with the front cover uppermost. Now push upward on the "Index Key." By this upward pressure the "Index Key" is forced in contact with the pad or shield, Fig. 1, number 1, which is placed on the last sheet of the preceding book, in this instance the Book of Mark. The pad or shield is placed at the terminating point of the "Index Key" to protect the sheet from the more or less sharp two edged head of the "Index Key." The above action is possible because the hole 2, Fig. 3, extends through the cover and all the sheets between the back cover and the desired book, including the first sheet of the desired book. The hole in the first sheet of the desired book is reinforced with a gummed reinforcement 3, such as is on the market for the repair of books. With the upward pressure by the "Index Key" pressing against the pad or shield, number 1, Fig. 1, the preceding books and front parts of the New Testament would be raised up. The remainder of the book would not be affected because the hole through which the "Index Key" with its steel shaft has been placed is much larger than the steel shaft; thus, the desired book and the first chapter of said book are separated from the other books.

With the book opened to a width of ¼ inch, or more if desired, the hole with the steel shaft in it and having the reinforcement around it become visible. Now, to secure this position and complete the operation of opening the New Testament to the desired book, slight pressure is exerted in a sidewise direction with the "Index Key" in the right hand. This will lock the steel shaft of the "Index Key" against the reinforced hole, number 3, Fig. 1, and the New Testament may now be fully opened to the desired book, in this example the Book of St. Luke. The "Index Key" is now removed and held in the right hand. The reader next selects the desired chapter, 2 through 24, chapter number one being obtained when the desired book was turned to. After selection of the desired chapter, the head of the "Index Key" is allowed to pass through the semicircles or notches, number 5, Fig. 1, until it comes to rest on the color dot, number 6, Fig. 1, on which sheet is the desired chapter. The position of the "Index Key" now being in an almost horizontal position, slight pressure downward is exerted on the "Index Key" so that the head of the "Index Key" will compress the sheets that are under it. This will cause a small separation of the sheets at the point and allow the "Index Key" to be inserted between the sheets to a depth of about ¾ the length of the shaft. The shaft, number 3, Fig. 4, with its two edged head, number 2, Fig. 4, can now be moved either up or down between the sheets, to a position near the bound edge of the book, then with slight upward pressure with the "Index Key" used as a tool the upper sheets can be flipped over and thus reveal the desired chapter.

The index is designed so that the several chapters contained within the desired book are obtained in an ascending or forward manner, such as Luke 3, Luke 7, Luke 12, etc. This is in accordance with most Bible references and has the advantage of impressing the Bible references on the mind in a systematic manner which makes them easier to remember. Therefore, with the above mentioned system, the column of indices on the sheet that has just been obtained will indicate only the remaining chapters of the book. As an example, the Book of Luke, chapter three is turned to. The column of chapter indices on this sheet will be 4 through 24; when chapter seven is turned to the column of chapter indices will be 8 through 24, etc. With this system, which has symmetry and order and is used by most Bible students and teachers already when referring to certain books or chapters of the Bible, a back index is avoided, the disadvantages of said back index being well known.

One of the very important features of the index is that it is operated almost wholly by a tool designed to operate the several parts of the index, this tool being the "Index Key" as explained in Fig. 4.

The Old Testament books are indexed in the same manner as the New Testament, which was described in detail, except of course it is necessary to pick up the Holy Bible with the right hand and the "Index Key" with the left hand, and manipulate the index with the hands in opposite relation to each other as they were when using the New Testament. The New Testament side of the Holy Bible is manipulated in the same way as described in detail for the New Testament.

While a particular embodiment of this invention is shown above, it will be understood, of course, that the invention is not to be limited thereto, since further modifications may be made, and it is contemplated, therefore, by the appended claims, to cover any such further modifications as fall within the true spirit and scope of this invention.

Having thus described the invention, what is claimed is:

1. As a new article of manufacture, a book comprising a plurality of flexible sheets bound together along one edge thereof having a margin on the free edge opposite the bound edge, the sheets being enclosed within covers less flexible than the sheets, at least one cover having a series of spaced perforations arranged near the outer margin opposite which are identifications corresponding to sections of the book, the spaced perforations extending through the pages in the margins thereof to the page identified on the cover opposite the perforation, the last perforated page at the bottoms of the perforated columns being provided with a reinforcing member which surrounds the perforation, whereby an instrument inserted in the perforation will contact the reinforced leaf corresponding to the identification on the cover and the cover will function in conjunction with the instrument as the fulcrum of a lever to open the book to the page identified on the cover and the sections identified by the perforations of varying depth being further provided with segmented columnar recesses on the outer edges of the pages, second identifications on the page at the top of the column identifying the page at the bottom whereby the same instrument may be inserted under the last page of a segmented column to select the desired page.

2. As a new article of manufacture, a book comprising a plurality of flexible sheets bound together along one edge thereof having a margin on the free edge opposite the bound edge, the sheets being enclosed within covers less flexible than the sheets, at least one cover having a series of spaced perforations arranged near the outer margin opposite which are identifications corresponding to sections of the book, the spaced perforations extending through the pages in the margins thereof to the page identified on the cover opposite the perforation, the last perforated page at the bottoms of the perforated columns being provided with a reinforcing member which surrounds the perforation, the first unperforated page being provided with a reinforcing member located opposite the perforations so that an instrument inserted in the perforations will contact the reinforcing members whereby the cover functions in conjunction with the instrument as the fulcrum of a lever when the point of the instrument is brought to bear against the reinforced last perforated page permitting the book to be opened to the page identified on the cover and the sections identified by the perforations of varying depth being further provided with segmented columnar recesses on the outer edges of the pages, second identifications on the page at the top of the column identifying the page at the bottom whereby the same instrument may be inserted under the last page of a segmented column to select the desired page.

References Cited in the file of this patent

UNITED STATES PATENTS

| | | |
|---|---|---|
| 197,345 | Denison | Nov. 20, 1877 |
| 533,811 | Hon | Feb. 8, 1895 |
| 1,106,158 | Pickett | Aug. 4, 1914 |